United States Patent
Shinkawa

(10) Patent No.: US 8,422,917 B2
(45) Date of Patent: Apr. 16, 2013

(54) LIGHT PROJECTING DEVICE, IMAGE READING DEVICE INCLUDING SAME, AND IMAGE FORMING APPARATUS INCLUDING THE IMAGE READING DEVICE

(75) Inventor: Shohei Shinkawa, Kawasaki (JP)

(73) Assignee: Ricoh Company, Limited, Tokyo (JP)

( * ) Notice: Subject to any disclaimer, the term of this patent is extended or adjusted under 35 U.S.C. 154(b) by 722 days.

(21) Appl. No.: 12/591,248

(22) Filed: Nov. 13, 2009

(65) Prior Publication Data

US 2010/0129116 A1    May 27, 2010

(30) Foreign Application Priority Data

Nov. 25, 2008    (JP) .................................. 2008-299387

(51) Int. Cl.
*H04N 1/04* (2006.01)
*G03G 15/041* (2006.01)
*F21V 7/04* (2006.01)

(52) U.S. Cl.
USPC ............................ 399/200; 358/474; 362/613

(58) Field of Classification Search .................. 399/118, 399/137, 200–202; 358/471, 474; 362/613
See application file for complete search history.

(56) References Cited

U.S. PATENT DOCUMENTS

| | | | |
|---|---|---|---|
| 6,469,808 B1 * | 10/2002 | Onishi et al. .................. | 358/475 |
| 7,495,682 B2 | 2/2009 | Kohchi et al. | |
| 7,537,367 B2 | 5/2009 | Sakurai | |
| 7,538,911 B2 | 5/2009 | Sakurai et al. | |
| 2001/0015892 A1 | 8/2001 | Fujimoto et al. | |
| 2005/0088707 A1 | 4/2005 | Sakurai et al. | |
| 2006/0008295 A1 | 1/2006 | Kohchi et al. | |
| 2006/0050390 A1 | 3/2006 | Sawada | |
| 2006/0197822 A1 | 9/2006 | Sakurai | |
| 2006/0279961 A1 | 12/2006 | Sakurai | |
| 2010/0195166 A1 | 8/2010 | Sawada et al. | |

FOREIGN PATENT DOCUMENTS

| | | |
|---|---|---|
| CN | 1723688 | 1/2006 |
| JP | 10-276297 | 10/1998 |
| JP | 2001-238048 | 8/2001 |

(Continued)

OTHER PUBLICATIONS

Japanese Office Action dated May 1, 2012, issued in Japanese Patent Application No. 2008-299387.
Chinese Office Action dated Jun. 24, 2011.

*Primary Examiner* — David Gray
*Assistant Examiner* — Erika J Villaluna
(74) *Attorney, Agent, or Firm* — Harness, Dickey & Pierce, P.L.C.

(57) ABSTRACT

A light projecting device includes a base board, a light guiding member, a holding member, a cover, and a positioning member. A plurality of light-emitting elements are arranged in a line on the base board in a main scan direction. The light guiding member faces a radiation surface of the light-emitting elements and guides light projected from the light-emitting elements to an irradiation region of an illuminated object. The holding member holds the base board. The cover covers the base board and the light guiding member. The positioning member positions the light guiding member on the holding member. The holding member and the cover sandwich the light guiding member positioned by the positioning member. The light projecting device includes the holding member, the light guiding member, the base board, and the cover as a single unit which is detachably mountable relative to a chassis of the light projecting device.

15 Claims, 11 Drawing Sheets

FOREIGN PATENT DOCUMENTS

| | | |
|---|---|---|
| JP | 2003-060854 | 2/2003 |
| JP | 2007-005860 | 1/2007 |
| JP | 2007-214923 | 8/2007 |
| JP | 2007-221360 | 8/2007 |
| JP | 2008-172564 | 7/2008 |
| JP | 2008-180841 | 8/2008 |
| TW | 5440460 | 7/2003 |

\* cited by examiner

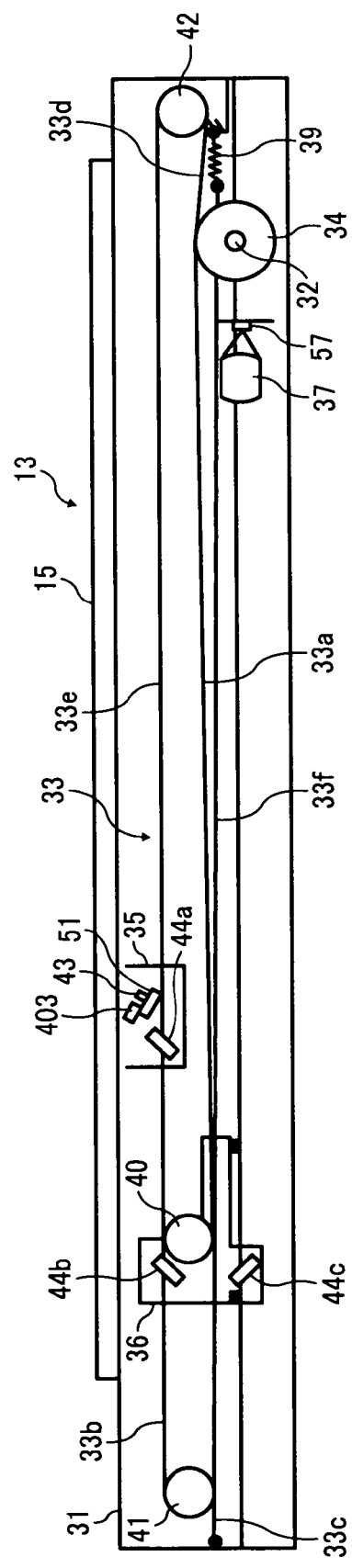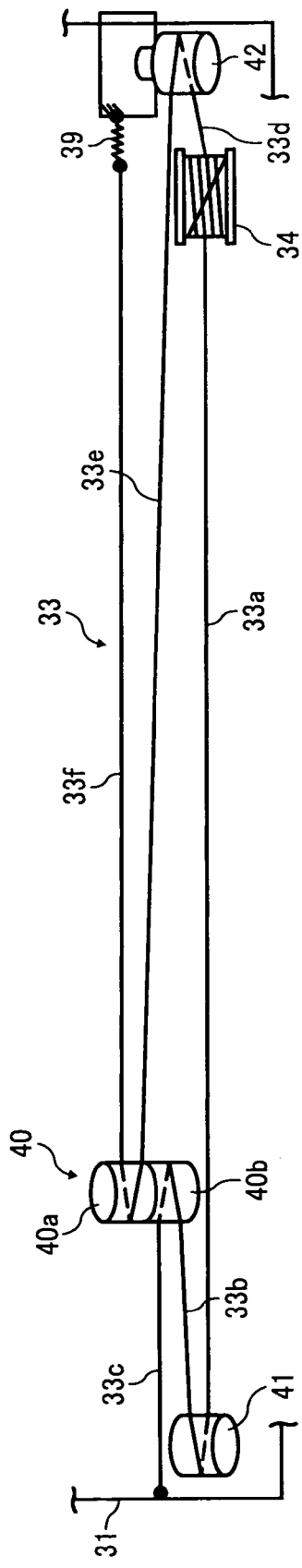

LIGHT PROJECTING DEVICE, IMAGE READING DEVICE INCLUDING SAME, AND IMAGE FORMING APPARATUS INCLUDING THE IMAGE READING DEVICE

CROSS-REFERENCE TO RELATED APPLICATIONS

This patent application is based on and claims priority pursuant to 35 U.S.C. §119 from Japanese Patent Application No. 2008-299387, filed on Nov. 25, 2008 in the Japan Patent Office, which is hereby incorporated herein by reference in its entirety.

BACKGROUND OF THE INVENTION

1. Field of the Invention

Exemplary aspects of the present invention generally relate to a light projecting device, an image reading device using the same, and an image forming apparatus using the image reading device.

2. Description of the Background Art

Generally, an image reading device such as a scanner employed in image forming apparatuses, for example, a facsimile machine, a copier, or a multi-functional system having a plurality of these functions, uses a light source to illuminate a document with light. The reflected light from the document is then reflected by a plurality of mirrors and directed onto an image pickup device such as, for example, a CCD image sensor.

In order to facilitate an understanding of the related art and of the novel features of the present invention, one example of a related-art image reading device is illustrated with reference to FIGS. 13 and 14. FIG. 13 is a side schematic view of the related-art image reading device. FIG. 14 is a perspective schematic view of the related-art image reading device.

The related-art image reading device 101 is a generally-known reduced optical system that includes a cylindrical xenon lamp 104 serving as a light source. Light projected by the xenon lamp 104 illuminates a not-shown document on a contact glass 102, and the diffuse reflection light from the document is directed to an image pickup device 110. The image pickup device 110 then converts the received light into electric signals.

The image reading device 101 includes a first carriage 103 and a second carriage 106. The first carriage 103 includes a first mirror 105 that deflects reflected light from the document. The second carriage 106 includes a second mirror 107 that further deflects the light from the first mirror 105, and a third mirror 108. The first carriage 103 and the second carriage 106 travel on a rail in the image reading device 101 to scan the document.

With such an image reading device, there is increasing market demand for a short rise time, low energy consumption, prolonged product life of the light source, and so forth. Thus, in recent years, a light source using a light-emitting element such as a light-emitting diode, also known as an LED, is often employed in the image reading device in place of the xenon lamp 104.

As illustrated in FIG. 15, in the image reading device using the LED, a bracket 121 that is V-shaped in cross-section is attached to the first carriage 103. An LED 122 and a circuit board (hereinafter referred to as an LED board) 123 that drives the LED 122 are mounted on the bracket 121.

A reflecting plate 118 (hereinafter referred to as a reflector) is mounted on the first carriage 103. The reflector 118 reflects light from the xenon lamp 104 to optimize an illumination distribution and eliminate shades when reading a document having an irregular surface, for example, a document having a pasted sheet or the like.

In the image reading device using the reduced optical system, the distance from the document surface to the image pickup device is relatively long, so that attenuation of the light projected from the light source between the document surface and the image pickup device becomes significant. Therefore, when using the LED in the image reading device, the intensity of the LED 122 needs to be increased. For this reason, a plurality of LEDs 122 is disposed in a main scan direction of the document to increase the light intensity.

In a case in which the LEDs 122 are arranged in an array, the LEDs 122 are obliquely arranged facing the document surface by the bracket 121. It is desirable that the illumination distribution on the document surface in a sub-scan direction be within an irradiation region E shown in FIG. 16. In other words, it is desirable that the light illuminate only an actual read region of the document. FIG. 16 shows the illumination distribution of the related-art image reading device using the LEDs.

However, even if the LEDs 122 are obliquely arranged and the light projected from the LEDs is reflected by the reflector 118 as described above, the light illuminates areas other than the irradiation region E. In such a case, when reading an image including a solid black portion between white portions, for example, the light reflected by the white portions in the irradiation region E enters the image pickup device 110, causing an output value of the solid black portion to increase and thus preventing accurate reproduction of the solid black portion.

To counteract such a difficulty, some related-art image reading devices include a light projecting device including a light guiding member disposed on the radiation surface of the LED array in a main scan direction to guide the light projected from the LEDs to the irradiation region in order to even out the illumination distribution in the irradiation region. With this configuration, the light is guided using a total reflection from both top and bottom surfaces of the light guiding member. Similarly, the amount of peripheral light at the end portions of a document, which typically decreases, can be increased by using the total reflection of the end surface (side surface) of the light guiding member in the main scan direction.

As noted the amount of light decreases from the end portion of the document. Thus, the amount of light available at the end portion is less than that of the center of the document. By contrast, when using the total reflection of the end surface (the side surface) of the light guiding member, a uniform amount of light can be obtained. In this case, it is desirable to dispose the farthest-end LED near the end surface (the side surface) of the light guiding member.

In order to securely hold the LED board and the light guiding member, one related-art approach proposes to position and fix the LED board and the light guiding member using screws. Screw holes are formed on the LED board and the light guiding member. However, the related-art approach suffers from a drawback in that because the screw holes are formed near the end surface of the light guiding member, the total reflection of the light from the LED at the side surface of the light guiding member (the end surface in the main scan direction) is hindered, thereby posing a risk of light loss. Furthermore, forming the screw holes near the end surface of the light guiding member easily causes welding trouble such as weld lines during the molding process, thereby increasing the time required for the molding process and reducing the yield. This ultimately causes an undesirable cost increase.

Furthermore, in order to form the screw holes, the length of the light guiding member is extended. As a result, the distance between the LED at the farthest end and the end surface of the light guiding member increases, thereby complicating efforts to use the total reflection at the end surface. In order to achieve an equal amount of light in the main scan direction, it is necessary to increase either the number of the LEDs or the length of the LED array.

Another related-art approach proposes using a mounting table to hold the LED array and the light guiding member, and a cover that covers the mounting table. The light guiding member and the LED array on the mounting table are fixed in place by the cover.

Although the cover and the mounting table hold the light guiding member without forming screw holes on the light guiding member, this approach also has a drawback in that the cover needs to be somehow fixed to the light guiding member or the mounting table, resulting in an increase in height. In addition, although the light guiding member and the LED board on the mounting table are fixed by the cover, it is not clear how the light guiding member and the LED board are positioned and fixed in place.

SUMMARY OF THE INVENTION

In view of the foregoing, in one illustrative embodiment of the present invention, a light projecting device includes a base board, a light guiding member, a holding member, a cover, and a positioning member. A plurality of light-emitting elements is arranged in a line along a main scan direction on the base board. The light guiding member faces a radiation surface of the light-emitting elements to guide light projected from the light-emitting elements onto a target irradiation region of a target object. The holding member holds the base board in place. The cover covers the base board and the light guiding member. The positioning member positions the light guiding member on the holding member. The light guiding member positioned on the holding member by the positioning member is positioned between the holding member and the cover.

In another illustrative embodiment of the present invention, a light projecting device includes a base board, a light guiding member, a holding member, a cover, a positioning member, and a chassis. A plurality of light-emitting elements is arranged on the base board in a line in a main scan direction. The light guiding member faces a radiation surface of the light-emitting elements to guide light projected from the light-emitting elements onto a target irradiation region of a target object. The holding member holds the base board in place. The cover covers the base board and the light guiding member. The positioning member positions the light guiding member relative to the holding member. The holding member is detachably mountable relative to the chassis. The holding member, the light guiding member positioned by the positioning member, the base board, and the cover constitute a single unit which is detachably mountable relative to the chassis.

Yet in another illustrative embodiment of the present invention, a light projecting device includes a base board, light guiding means, holding means, a cover, and positioning means. A plurality of light-emitting elements is arranged in a line on the base board in a main scan direction. The light guiding means faces a radiation surface of the light-emitting elements and guides light projected from the light-emitting elements to a target irradiation region of a target illuminated object. The holding means holds the base board in place. The cover covers the base board and the light guiding means. The positioning means positions the light guiding means relative to the holding means. The light guiding means positioned on the holding means by the positioning means is positioned between the holding means and the cover.

Additional features and advantages of the present invention will be more fully apparent from the following detailed description of illustrative embodiments, the accompanying drawings and the associated claims.

BRIEF DESCRIPTION OF THE DRAWINGS

A more complete appreciation of the disclosure and many of the attendant advantages thereof will be readily obtained as the same becomes better understood by reference to the following detailed description of illustrative embodiments when considered in connection with the accompanying drawings, wherein:

FIG. 3A is a front schematic view of the image reading unit of FIG. 2;

FIG. 3B is a perspective schematic view of the image reading unit of FIG. 2;

DETAILED DESCRIPTION OF ILLUSTRATIVE EMBODIMENTS

Figure 1:
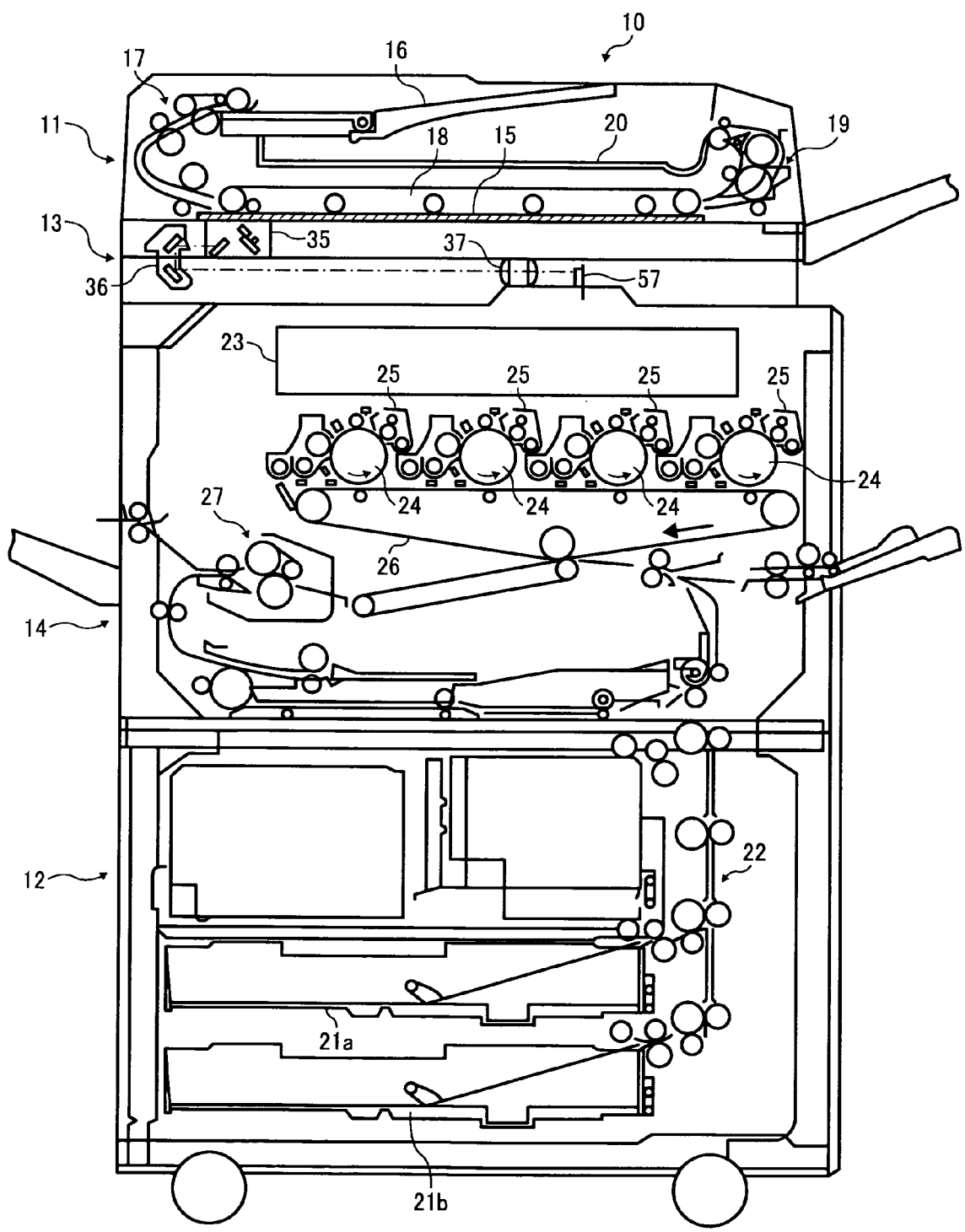
FIG. 1 is a cross-sectional schematic view of a copier as an example of an image forming apparatus according to a first embodiment of the present invention.

In describing illustrative embodiments illustrated in the drawings, specific terminology is employed for the sake of clarity. However, the disclosure of this patent specification is not intended to be limited to the specific terminology so selected, and it is to be understood that each specific element includes all technical equivalents that operate in a similar manner and achieve a similar result.

Illustrative embodiments of the present invention are now described below with reference to the accompanying drawings.

In a later-described comparative example, illustrative embodiment, and alternative example, for the sake of simplicity of drawings and descriptions, the same reference numerals will be given to constituent elements such as parts and materials having the same functions, and redundant descriptions thereof omitted.

Typically, but not necessarily, paper is the medium from which is made a sheet on which an image is to be formed. It should be noted, however, that other printable media are available in sheet form, and accordingly their use here is included. Thus, solely for simplicity, although this Detailed Description section refers to paper, sheets thereof, paper feeder, etc., it should be understood that the sheets, etc., are not limited only to paper, but includes other printable media as well.

Referring now to the drawings, wherein like reference numerals designate identical or corresponding parts throughout the several views, and initially to FIG. 1, one example of an image forming apparatus according to an illustrative embodiment of the present invention is described. FIG. 1 is a schematic diagram illustrating a copier as an example of the image forming apparatus according to the illustrative embodiment. The present invention can be applied to the image forming apparatus including, but not limited to, a copier, a facsimile machine, a multi-functional system including functions thereof, and so forth.

Embodiment 1

As illustrated in FIG. 1, the image forming apparatus 10 includes an automatic document transport unit 11, a sheet feeder 12, an image reading unit 13, and image forming unit 14 serving as an image forming mechanism.

The automatic document transport unit 11 includes a contact glass 15, a document tray 16, a sheet separation device 17, a transport belt 18, a sheet discharge device 19 including sheet discharge rollers, and so forth. The sheet separation device 17 includes a various types of rollers such as a sheet feed roller and a separation roller. A document placed on the document tray 16 is transported onto the contact glass 15 which is a transparent member by the sheet separation device 17. The document after being read is transported from the contact glass 15 by the transport belt 18 and discharged onto the sheet discharge tray 20 by the sheet discharge device 19 including the sheet discharge rollers.

When reading both sides of the document, the transport belt 18 and a reversing mechanism provided to the sheet discharge device 19 reverse the document to read the other side of the document that is not yet read.

The sheet feeder 12 includes sheet feed cassettes 21a and 21b, and a sheet feed mechanism 22 including a various types of rollers. Recording media sheets in different sizes are stored in the sheet feed cassettes 21a and 21b. The various types of rollers of the sheet feed mechanism 22 transport the recording media sheets stored in the sheet feed cassettes 21a and 21b to a transfer position.

As will be later described in detail, in the image reading unit 13, a first carriage 35 and a second carriage 36 are driven in the left and the right directions (a sub-scan direction) so as to project light to a document surface from light sources to read the document. When read light is reflected by mirrors, the read light is taken into an image read sensor such as CCD or the like by a lens unit 37.

The image forming unit 14 includes an exposure device 23, a plurality of photoreceptor drums 24, a plurality of developing devices 25, a transfer belt 26, and a fixing device 27.

Based on read signals taken into the lens unit, the exposure device 23 forms write signals. The write signals generated by the exposure device 23 is formed on the surface of the plurality of photoreceptor drums 24 for colors cyan, magenta, yellow, and black. The developing devices 25 store different colors of toner, cyan, magenta, yellow, and black and supply the respective color of toner to the photoreceptor drums 24 so as to visualize the write signals on the photoreceptor drums 24. The fixing device 27 fixes a color image transferred onto a recording medium.

Figure 2:
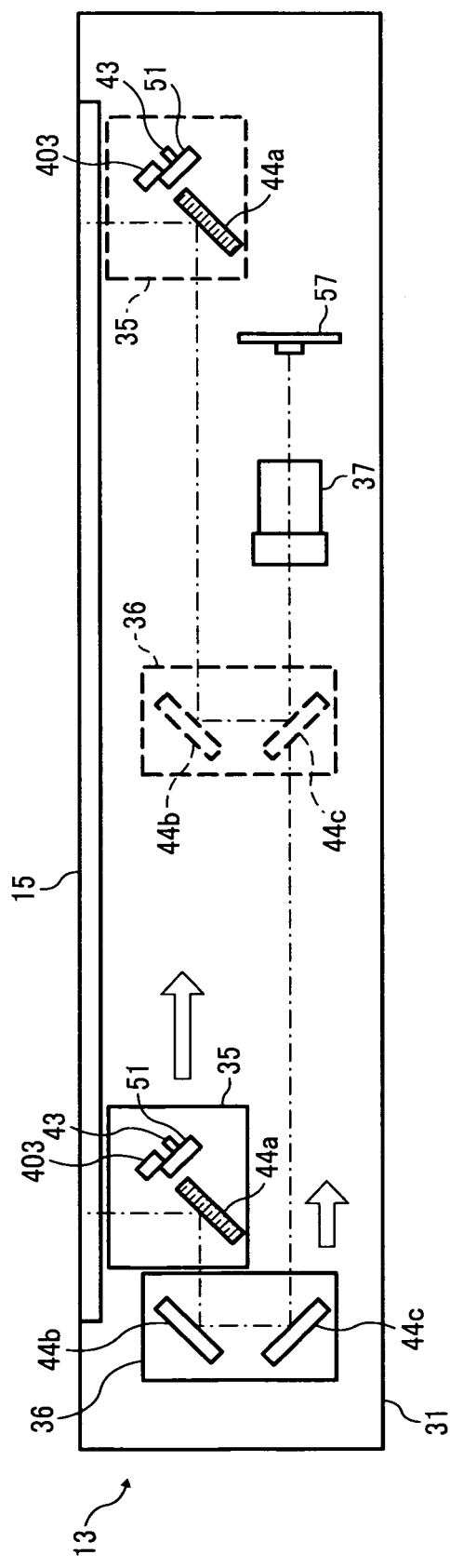
FIG. 2 is a side schematic view of an image reading unit according to the first embodiment of the present invention.

With reference to FIGS. 2, 3A and 3B, a description is provided of the image reading unit 13. FIG. 2 illustrates a side schematic view of the image reading unit 13. FIG. 3A illustrates a front schematic view thereof, and FIG. 3B illustrates a perspective schematic view thereof for explaining a relation of a drive wire 33 for driving the second carriage 36 and drive pulleys. FIG. 3B illustrates a connecting state of the drive wire 33.

The image reading unit 13 includes a main body frame 31, a drive shaft 32, drive wires 33, a wire drive pulley 34, the first carriage 35, the second carriage 36, the lens unit 37, a tension spring 39, a carriage pulley 40, an idler pulleys 41 and 42, and an image pickup device 57.

Inside the main body frame 31, a first rail and a second rail, not illustrated, are disposed. The first carriage 35 is slidably attached to the first rail. The second carriage 36 is slidably attached to the second rail.

The drive shaft 32 is connected to a motor, not illustrated. The wire drive pulley 34 is attached to the drive shaft 32. The drive wires 33 are wound around the drive pulley 34 and stretched in a predetermined direction, that is, the left and the right directions in FIG. 3A.

Two drive wires 33 are used for driving the first carriage 35 and driving the second carriage 36. In FIGS. 3A and 3B, one of drive wires 33 that is used for driving the second carriage 36 is illustrated.

A set of the drive wire 33 and the idler pulleys 41 and 42 is provided at both the front and the back of the main body frame 31. Because the drive wire 33 and the idler pulleys 41 and 42 at both sides have the same configuration and function, a description is provided of the drive wire 33, the idler pulleys 41 and 42 at one side of the main body frame 31. In other words, according to the illustrative embodiment, there are two drive wires 33, and the idler pulleys 41 and 42 are provided at both front and back of the main body frame 31.

The second carriage 36 is provided with the carriage pulley 40. The drive wire 33 is extended via the carriage pulley 40 and the idler pulleys 41 and 42.

Figure 4:
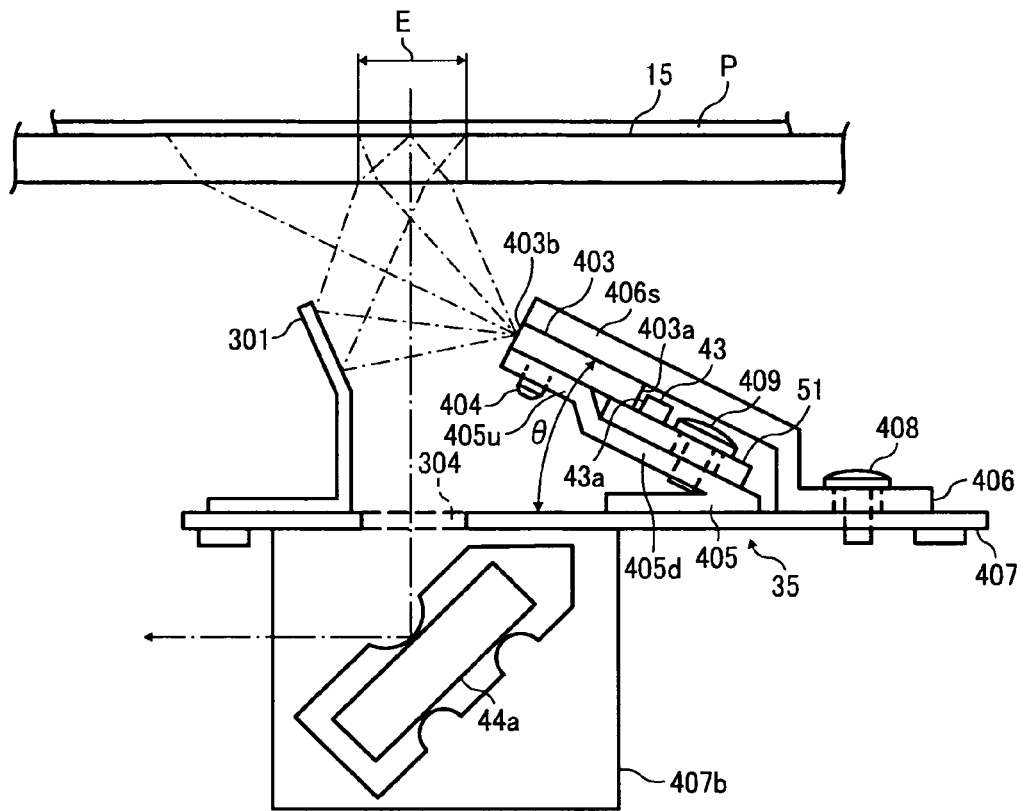
FIG. 4 is a front schematic view of a light projecting device according to the first embodiment of the preset invention.
Figure 5:
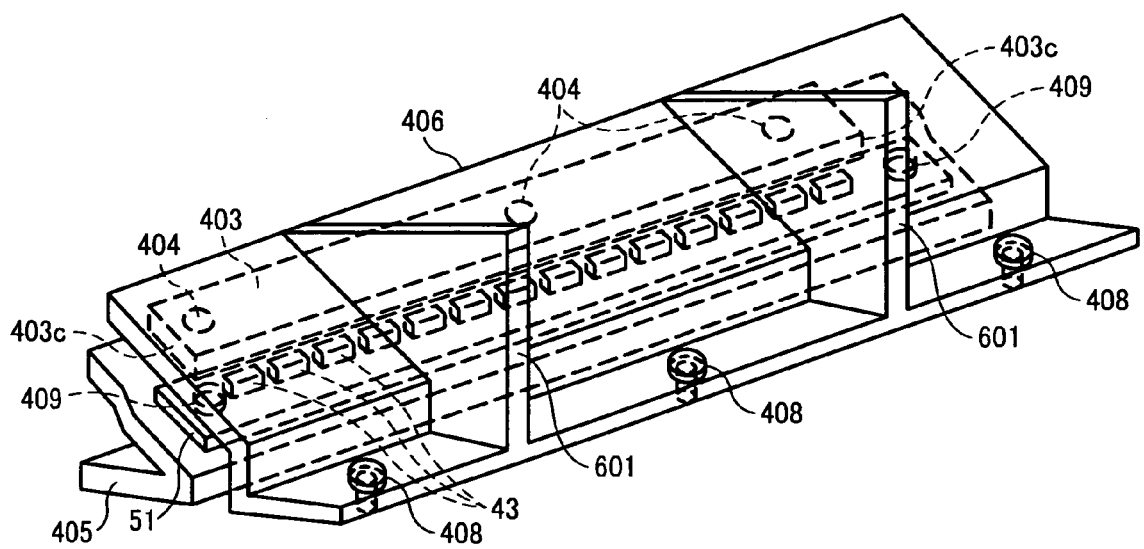
FIG. 5 is a perspective schematic view of the light projecting device according to the first embodiment of the preset invention.

As illustrated in FIGS. 4 and 5, the first carriage 35 includes a chassis 407 and a pair of side plates 407b. FIG. 4 illustrates a front schematic view of the light projecting device. FIG. 5 illustrates a perspective schematic view of the light projecting device. The chassis 407 is a flat sheet metal. The pair of the side plates 407b hangs from the chassis 407. A first mirror 44a is disposed between the side plates 407b.

The side plates 407b are separated at a certain distance in a sheet surface direction (the main scan direction). In FIG. 4, only one side of the side plates 407b is illustrated.

As illustrated in FIG. 4, a mounting table 405 serving as a holding member is attached to the chassis 407 by a screw, not illustrated. The mounting table 405 is formed of a sheet metal having relatively good heat dissipation and bent at a predetermined angle. The mounting table 405 includes an attachment portion including an attachment surface that is attached to the chassis 407 and a slant portion. A predetermined angle is formed between the slant portion and the chassis 407.

The slant portion of the mounting table 405 includes a step portion in a sub-scan direction. The step portion consists of an upper step 405u and a lower step 405d such that the space between the lower step 405d and the cover 406 is greater than the space between the upper step 405u and a cover 406. The upper step 405u and the lower step 405d are substantially parallel with each other.

A light guiding plate 403 serving as a light guiding member is positioned on the upper step 405u of the mounting table 405. The light guiding plate 403 is formed of resin such as acrylic having high transmissivity and has a flat and substantially rectangular shape in a main scan direction.

According to the present illustrative embodiment, three positioning pins 404 (protruding portions) integrally formed (molded) with the light guiding plate 403 are inserted into three pin holes including two pin holes 404a and one pin hole 404b (shown in FIG. 8) that penetrate through the mounting table 405. The three positioning pins 404a and 404b are formed on the bottom surface of the light guiding plate 403 at a center and at both ends thereof in a longitudinal direction.

A planar circuit board (hereinafter referred to as an LED board) 51 is attached to the lower step 405d of the mounting table 405 by a screw 409. The screw 409 is provided substantially at a mounting portion side of the cover 406 that is at the right side in FIG. 4 so as to fix both ends of the LED board 51 in the main scan direction.

When both ends of the LED board 51 are fixed, the center of the LED board 51 may deform due to heat generated from the LED board 51. That is, the center of the LED board 51 may warp upward due to heat generated by the LED board 51. When this happens, a radiation surface 43a of an light emitting diode (hereinafter referred to as an LED) 43 deviates from an incident surface 403a of the light guiding plate 403, thereby causing fluctuation in the amount of light in the main scan direction.

In order to address this problem, according to the illustrative embodiment, the LED board 51 near an LED array is held at the incident surface side of the light guiding plate 403 in the main scan direction. With this configuration, the LED board 51 is prevented from warping. The LED board 51 contacts the mounting table 405 over the main scan direction. Because the mounting table 405 and the chassis 407 are made of sheet metal, heat generated by the LED board 51 is dissipated due to heat conduction, thereby preventing deformation of the LED board 51.

In terms of securing a proper amount of light and prevention of irregularity in the light amount in the main scan direction as well as in terms of assembly, the screw 409 is used to position and fix the LED board 51. However, a fixing method is not limited to using the screw 409. Alternatively, the LEDs 43 may abut the light guiding plate 403, or a jig such as a spacer may be used.

A plurality of side-view type LEDs 43 is attached to the LED board 51 in the main scan direction. When the LED board 51 is operated, light is projected from the radiation surface 43a (the left end surface in FIG. 4) of the LEDs 43 to the incident surface 403a (the right end surface in FIG. 4) of the light guiding plate 403.

Using total reflection of the light guiding plate 403, light is projected evenly from the radiation surface 403b (the left end surface in FIG. 4) of the light guiding plate 403 to a reflector 301 as well as the contact glass 15. According to the present illustrative embodiment, the positioning pins 404 are disposed between the LEDs 43 so as not to face the LEDs 43. With this configuration, the light incident upon the light guiding plate 403 is prevented from getting absorbed by the positioning pins 404.

The height of the step portion of the mounting table 405 is configured such that the bottom surface of the light guiding plate 403 and the top surface of the LED board 51 is at the same plane. In this case, the radiation surface 43a of the LED 43 on the LED board 51 faces the incident surface 403a of the light guiding plate 403.

The area of the radiation surface 43a of the LED 43 is smaller than the area of the incident surface 403a of the light guiding plate 403. In other words, the height of the radiation surface 43a is shorter than that of the incident surface 403a.

There is a predetermined space between the LEDs 43 and the light guiding plate 403 in the sub-scan direction. However, in order to use total reflection of the light guiding plate 403, the LED 43 are disposed in the vicinity of side surfaces 403c of the light guiding plate 403, that is, the surface other than the incident surface and the radiation surface of the light guiding plate 403.

The area of the incident surface 403a of the light guiding plate 403 is greater than the area of the radiation surface 43a of the LED 43. In other words, the height of the incident surface 403a of the light guiding plate 403 is greater than that of the radiation surface 43a. Accordingly, the light projected at a wide angle reliably incidents upon the incident surface 403a.

The light guiding plate 403 has a rectangular shape suitable for total reflection. In other words, the light guiding plate 403 has an adequate length in the light guiding direction. With this configuration, while the light incident upon the light guiding plate 403 is internally totally reflected and travels in the light guiding plate 403, the light obtains a proper illumination distribution.

Furthermore, the LED 43 and the light guiding plate 403 are separated so as to prevent the light guiding plate 403 and the LED 43 from contacting each other causing damage due to variations in the LEDs 43 constituting the LED array.

As illustrated in FIG. 4, the cover 406 is attached to the chassis 407 by a plurality of screws 408 serving as a first attach-detach mechanism, thereby preventing the cover 406 from deforming (warping) at the place other than both ends thereof due to heat generated by the LED board 51. In particular, the center portion of the cover 406 is prevented from rising.

The cover 406 includes an attachment portion including screw holes through which the screws for fastening the cover 406 on the chassis 407 are inserted, a slant surface 406s forming a predetermined angle θ with the chassis 407, and a plurality of strengthening ribs 601 (shown in FIG. 5) serving as strengthening members that enhance stiffness of the cover 406.

In this case, the mounting portion of the cover 406 has a substantially L-shape in cross section in the sub-scan direction. The strengthening ribs 601 are substantially vertical relative to the main scan direction and arranged in the sub-scan direction. The slant surface 406s of the cover 406 and the slant surface of the mounting table 405 (the upper step 405u and the lower step 405d) are substantially parallel.

Figure 12:
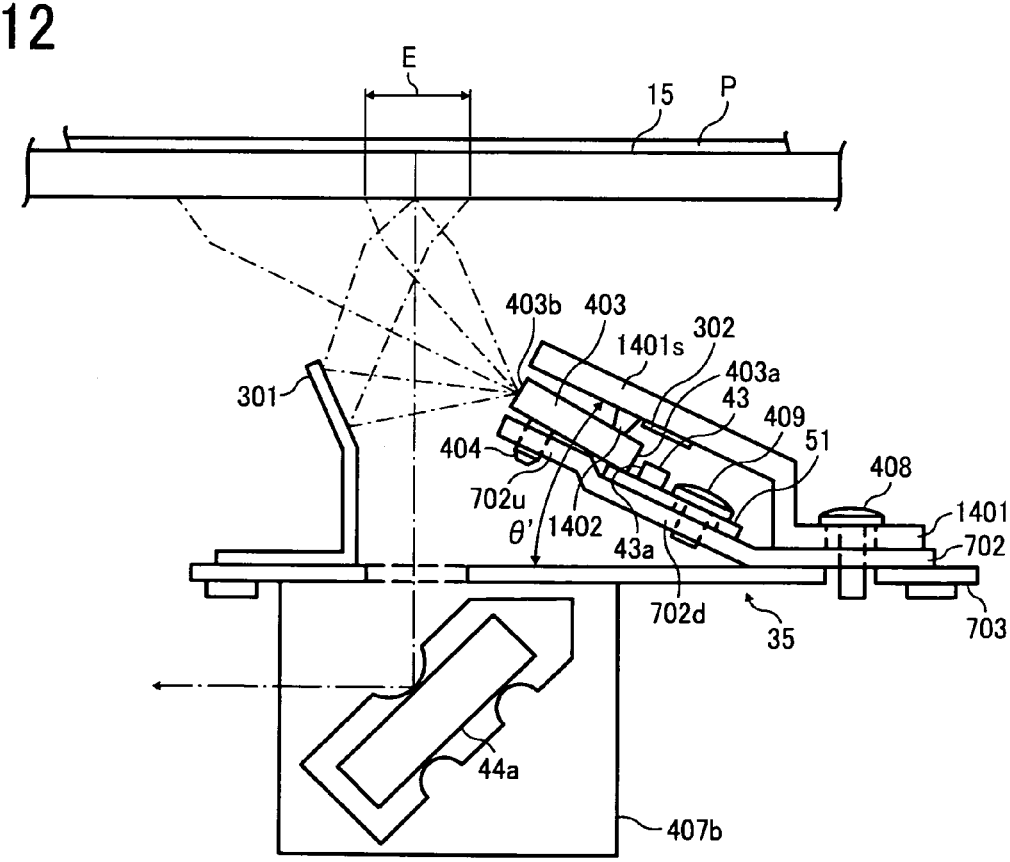
FIG. 12 is a front schematic view of the light projecting unit according to a fourth embodiment of the present invention.
Figure 13:
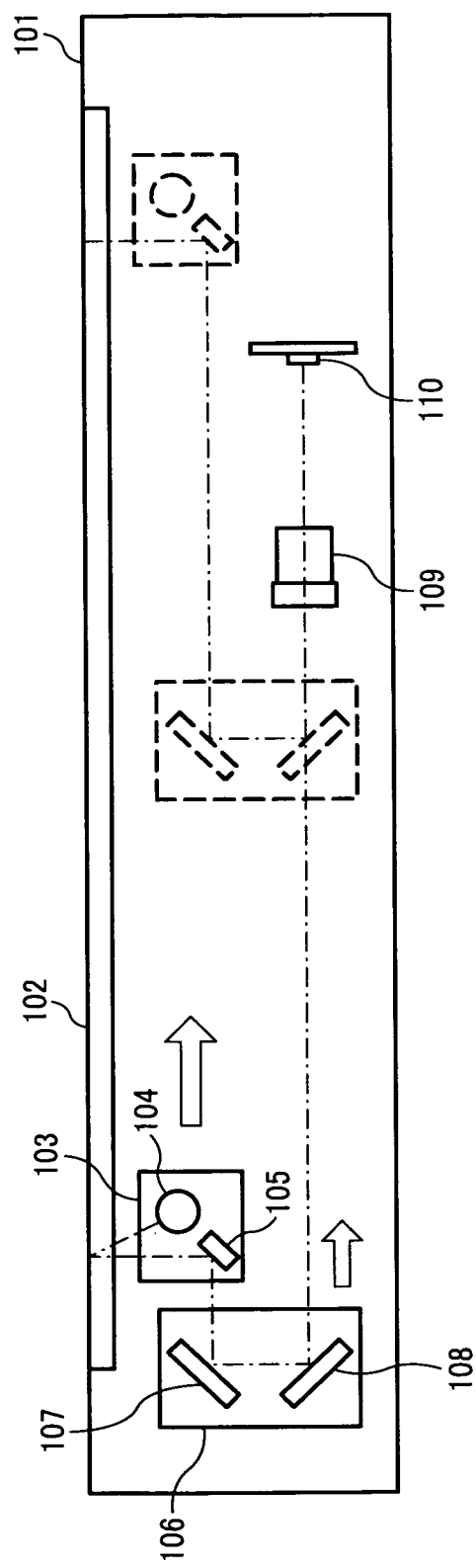
FIG. 13 is a side schematic view of a related-art image reading device.
Figure 14:
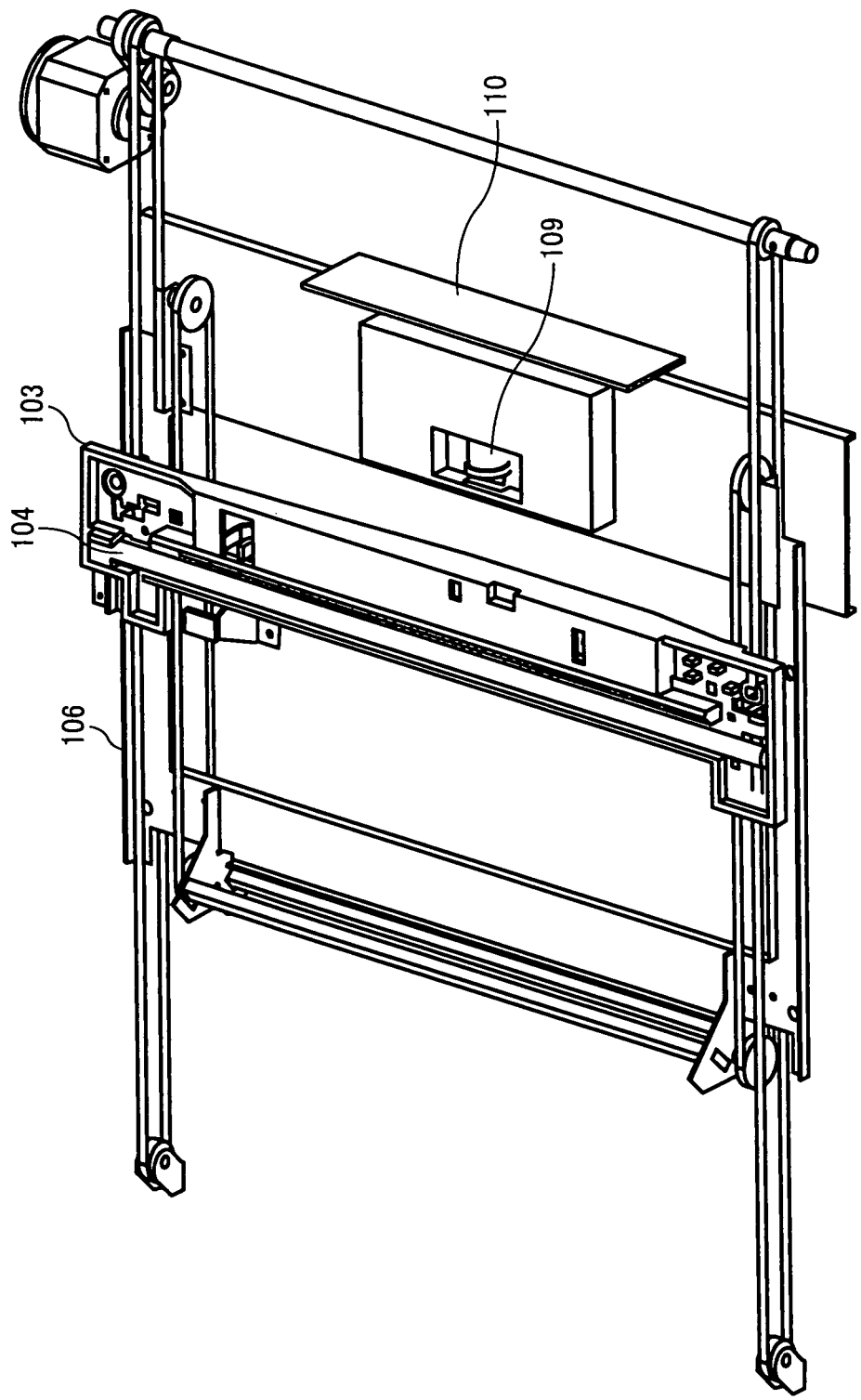
FIG. 14 is a perspective schematic view of the related-art image reading device.
Figure 15:
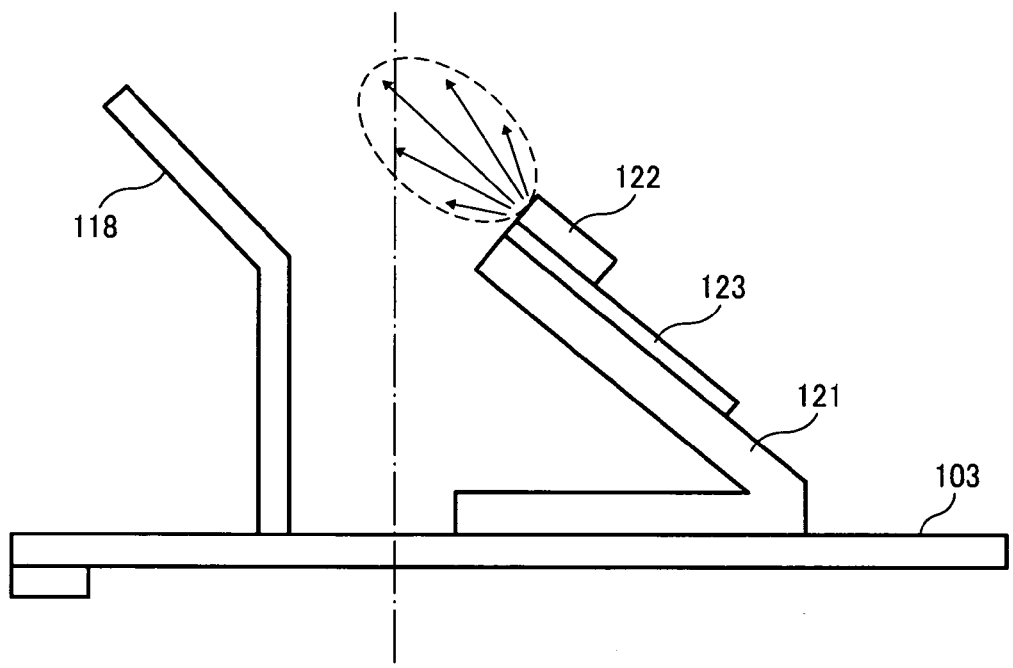
FIG. 15 is a schematic diagram illustrating a related-art light projecting device using a light-emitting diode (LED)
Figure 16:
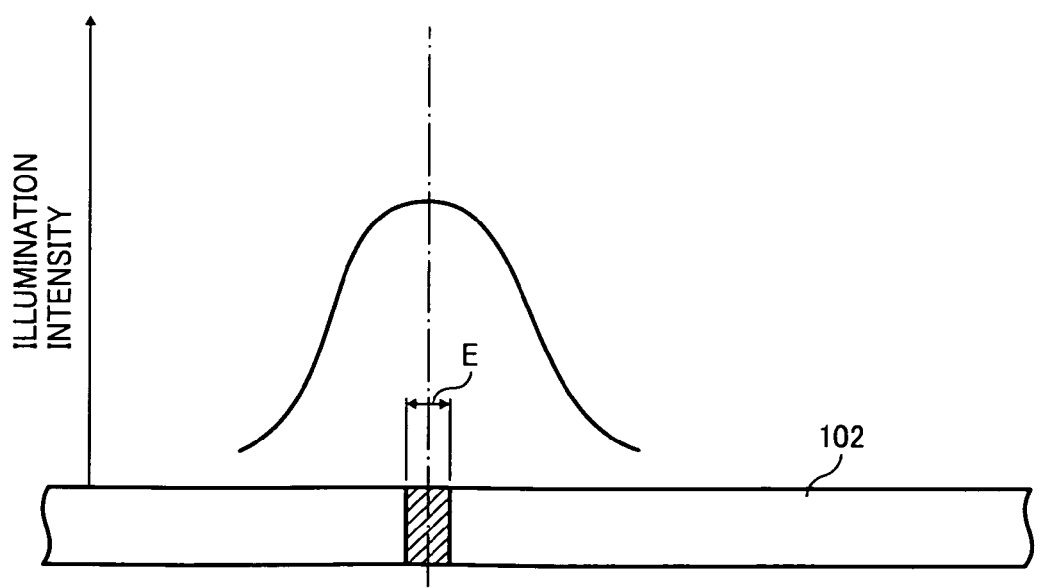
FIG. 16 is a schematic diagram illustrating an illumination distribution of the related-art light projecting device of FIG. 15.

It is preferable that the angle between the slant surface 406s of the cover 406 and the chassis 407 be less than a predetermined angle θ (a design value) as shown in FIG. 12.

The bottom surface of the slant surface 406s of the cover 406 and the slant surface of the mounting table 405, that is, the top surface of the upper step 405u, sandwich the light guiding plate 403.

Roughing process is performed on the bottom surface of the slant surface 406s of the cover 406, the slant surface of the mounting table 405 (the top surface of the upper step 405u), and the top surface of the LED board 51, to the extent that the total reflection of the light guiding plate 403 is not hindered. In other words, when a gap is formed between the light guiding plate 403 and other components, the light guided by the light guiding plate 403 is prevented from being absorbed by other components contacting the light guiding plate 403.

The projected light from the LED 43 incidents upon the incident surface 403a of the light guiding plate 403, advances in the light guiding plate 403 while the light is reflected (totally reflected) by the top and the bottom surfaces and the side surfaces of the light guiding plate 403. Subsequently, the light is projected from the radiation surface 403b of the light guiding plate 403 to the reflector 301 and the contact glass 15.

As illustrated in FIG. 4, the first carriage 35 includes the reflector 301 serving as a reflective member. The reflector 301 faces the radiation surface 403b of the light guiding plate 403 sandwiched by the mounting table 405 and the cover 406.

The upper portion of the reflector 301 includes a bent portion that is bent in the sub-scan direction, that is, toward a return side of the first carriage 35 in the moving direction thereof, such that the light projected from the light guiding plate 403 is directed to the contact glass 15.

The bent portion of the reflector 301 reflects the light projected from the light guiding plate 403. Accordingly, when reading a document having an irregular surface, for example, a document having a pasted sheet or the like, shades generated by the irregular surface can be eliminated.

According to the illustrative embodiment, the projected light from the LED 43 passes through the light guiding plate 403, is reflected by the reflector 301, and projected within the irradiation region E of the contact glass 15.

As illustrated in FIG. 4, the irradiation region E extends in the sub-scan direction of the document P. In the irradiation region E, an image of the document P as an illuminated body on the contact glass is read.

The light guiding plate 403 is disposed between the LEDs 43 and the contact glass 15. The LEDs 43 are disposed on the top surface of the LED board 51.

The cover 406 prevents the light from leaking to the right side in the sub-scan direction relative to the irradiation region of the contact glass 15. In other words, the light is prevented from leaking in the moving direction of the first carriage 35 that travels to the sub-scan side of the document, thereby making it possible to project the light within the irradiation region E.

Furthermore, the cover 406 is formed of a light shield member, for example, a polyester film and PET including a black carbon, having relatively high light density through which the light is difficult to penetrate. With this configuration, light is reliably shielded by the cover 406.

The chassis 407 includes an opening 304 from which the light projected from the light guiding plate 403 to the document P and reflected by the document P incidents upon the first mirror 44a.

The first carriage 35 is disposed between the wire drive pulley 34 and the second carriage 36. When the first carriage 35 is pulled by the drive wire 33 and travels at a predetermined speed V, the light projecting device including the cover 406, the mounting table 405, the light guiding plate 403, the LED board 51, and so forth, illuminates the document placed on the contact glass 15 with light.

When the light is projected to the document from the light guiding plate 403, the reflected light from the document is reflected by the first mirror 44a against the second carriage 36. Then, the reflected light is reflected by the second mirror 44b and then the third mirror 44c of the second carriage 36. Subsequently, the light incidents upon the lens unit 37.

The reflected light is focused, and an image is formed on the image pickup device 57 such as the CCD disposed on the focus plane by an imaging lens provided to the lens unit 37. The image pickup device 57 scans over the line along the LEDs 43 on the document.

The second carriage 36 travels in the same direction as that of the first carriage 35 at a half speed of the first carriage 35, that is, at a speed V/2, so as to cancel out an overlapping light path due to the light reflected by the second mirror 44b and the third mirror 44c. The second carriage 36 travels a travel distance (L/2) that is a half of the travel distance L of the first carriage 35.

With this configuration, the length of the light path from the document to the lens 7 does not fluctuate while first carriage 35 and the second carriage 36 travel.

As described above, the drive wires 33 are wound around the wire drive pulley 34 and stretched in the left and the right directions.

A wire portion 33a of the drive wire 33 extending in the left direction is turned around the idler pulley 41, the shaft of which is fixed to the main body frame 31. The wire portion 33a after being turned around is indicated as a wire portion 33b.

The wire portion 33b arrives at and is turned around an outer carriage pulley 40b. The wire portion 33b after being turned around is indicated as a wire portion 33c. The end portion of the wire portion 33c is fixed to the idler pulley 41.

A wire portion 33d of the drive wire 33 extending in the right direction is turned around the idler pulley 42 fixed to the main body frame 31. The wire portion 33d after being turned around is indicated as a wire portion 33e. The wire portion 33e arrives at and is turned around an inner carriage pulley 40a. The wire portion 33e after being turned around is indicated as a wire portion 33f and is fixed to the idler pulley 42 through a tension spring 39 serving as a spring.

Although not illustrated in FIG. 2, a home position sensor is provided at the left side. In FIG. 2, the first carriage 35 travels to the left passing the home position sensor, and the motor that drives the drive shaft 32 is driven for a predetermined pulse. After the motor is driven for the predetermined pulse, the motor is stopped and the wire drive pulley 34 is also stopped through the drive shaft 32. This position is a home position for the first carriage 35. After the document is read, the first carriage 35 always travels to the home position and starts to travel again therefrom.

According to the illustrative embodiment, when the LEDs 43 illuminate the document through the light guiding plate 403 to scan the document, the first carriage 35 and the second carriage 36 travel in the scan direction, that is, to the right in FIG. 1. When returning to the home position, the first carriage 35 and the second carriage 36 travel to the left (in a return direction) in FIG. 1.

When the first carriage 35 and the second carriage 36 travel in the return direction, the document reading speed does not affect the first carriage 35 and the second carriage 36. Therefore, in order to increase productivity of documents, the first carriage 35 and the second carriage 36 travel at high speed.

When the first carriage 35 and the second carriage 36 travel in the sub-scan direction in the image forming apparatus 10, the light is projected from the LEDs 43 through the light guiding plate 403 to the document P, and a part of the light projected from the light guiding plate 403 is reflected to the document P by the reflector 301. As a result, the light illuminates the document P within the irradiation region E.

The reflected light from the document P is reflected by the first mirror 44a, the second mirror 44b, and the third mirror 44c, respectively. Subsequently, the reflected light incidents upon the lens unit 37. The imaging lens of the lens unit 37 focuses the light at the image pickup device 57 disposed on the focus plane. Accordingly, the image pickup device 57 scans over the line along the LEDs 43 and the light guiding plate 403 on the document in the main scan direction and the sub-scan direction.

According to the present illustrative embodiment, in the image forming apparatus 10, the light guiding plate 403 is sandwiched between the mounting table 405 and the cover 406, thereby eliminating a need to provide screw holes for fixing the light guiding plate 403 at both ends thereof in the main scan direction. With this configuration, when molding the light guiding plate 403, a welding trouble such as weld line during the molding process can be prevented in the vicinity of the screw holes.

Furthermore, both the top and the bottom surfaces as well as the side surfaces of the light guiding plate 403 in the main scan direction can reflect the incident light from the LEDs 43, thereby being able to direct the incident light from the LEDs 43 to the contact glass 15 and the reflector 301 using the total reflection of the light guiding plate 403.

The total reflection enables the projected light from the LEDs 43 to be efficiently directed from the light guiding plate 403 to the irradiation region E. The proper amount of light for reading the document can be reliably supplied to the irradiation region E.

If the light guiding plate 403 does not include the screw holes and is attached to the mounting table 405 using an adhesive or a double-sided tape, the light incident upon the light guiding plate 403 is absorbed by the adhered portion, preventing the total reflection in the light guiding plate 403, more particularly, at the top and the bottom surfaces and the side surfaces of the light guiding plate 403.

According to the present illustrative embodiment, the light guiding plate 403 has a simple rectangular shape and does not include the screw holes, thereby allowing easy manufacturing and reducing the cost. Also, the size thereof is reduced as well. Thus, a small illumination system can be obtained.

Furthermore, the total reflection of the side surfaces of the light guiding plate 403 other than the incident surface and the radiation surface can be used. Therefore, when scanning the document P on the contact glass 15 in the main scan direction, the proper amount of light necessary for reading the document can be efficiently supplied.

According to the present illustrative embodiment, the top surface of the cover 406 includes the strengthening ribs 601 to increase stiffness of the cover 406 so as to prevent deformation of the cover 406 due to heat from the LED board 51 and to prevent the positioned light guiding plate 403 from rising from the mounting table 405.

The light guiding plate 403 contacts the mounting table 405 over the main scan direction, and the LED board 51 contacts the light guiding plate 403. With this configuration, the position of the LEDs 43 and the light guiding plate 403 is reliably maintained so that the amount of light in the main scan direction is prevented from varying.

Causes of the light guiding plate 403 to rise from the mounting table 405 include, but are not limited to, for example, deformation of the LED board 51 due to generation of heat, vibration during operation, and shock during transportation.

According to the present illustrative embodiment, the plurality of the LEDs 43 is provided along the main scan direction of the document, thereby increasing the amount of light irradiation. Even if the reduced optical system is employed in the image forming apparatus 10 and the distance between the document surface and the image pickup device 57 is relatively long, the light projected against the irradiation region E can reach the image pickup device 57, preventing deterioration of the accuracy in reading the document P.

According to the present illustrative embodiment, screws are used to attach the mounting table 405 to the chassis 407. Alternatively, the mounting table 405 can be attached to the chassis 407 using an adhesive, welding, or any other suitable methods.

According to the present illustrative embodiment, the material of the cover 406 is resin. Alternatively, metal can be used. In such a case, the heat generated by the plurality of the LEDs 43 can be efficiently dissipated, thereby reducing a temperature difference between the plurality of the LEDs 43.

Embodiment 2

Figure 6:
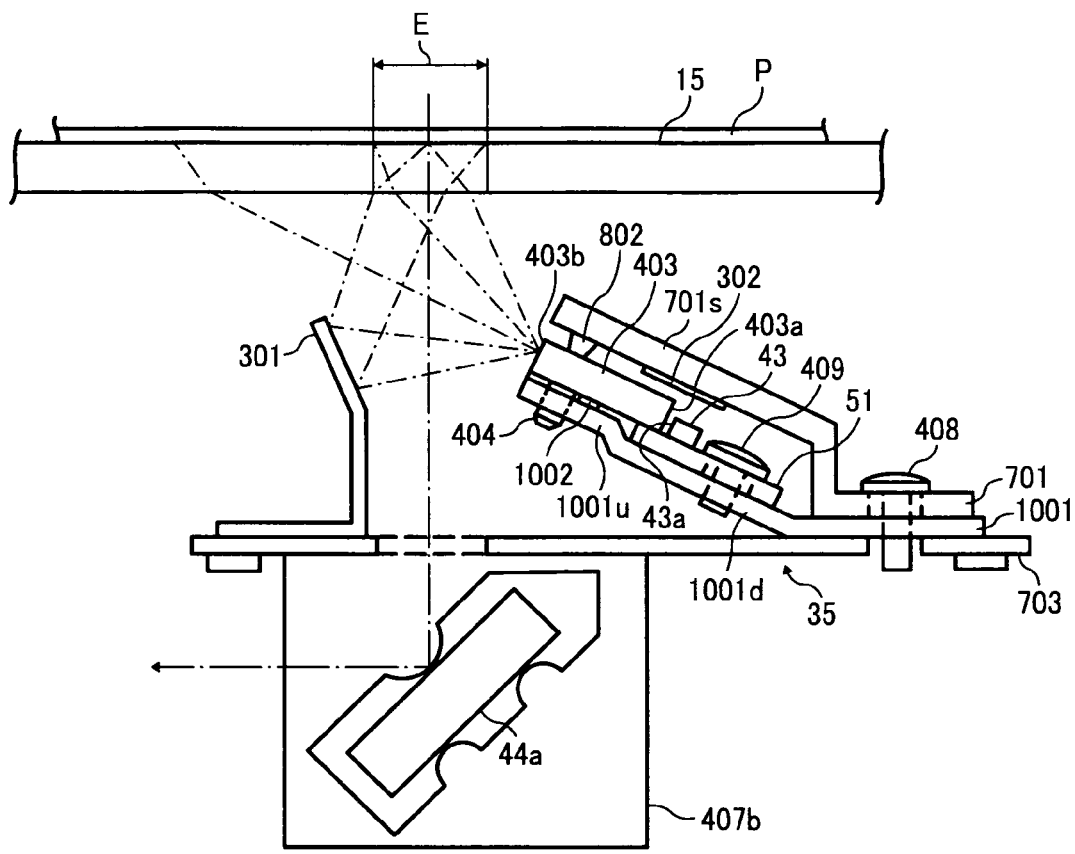
FIG. 6 is a front schematic view of the light projecting device according to a second embodiment of the present invention.
Figure 7:
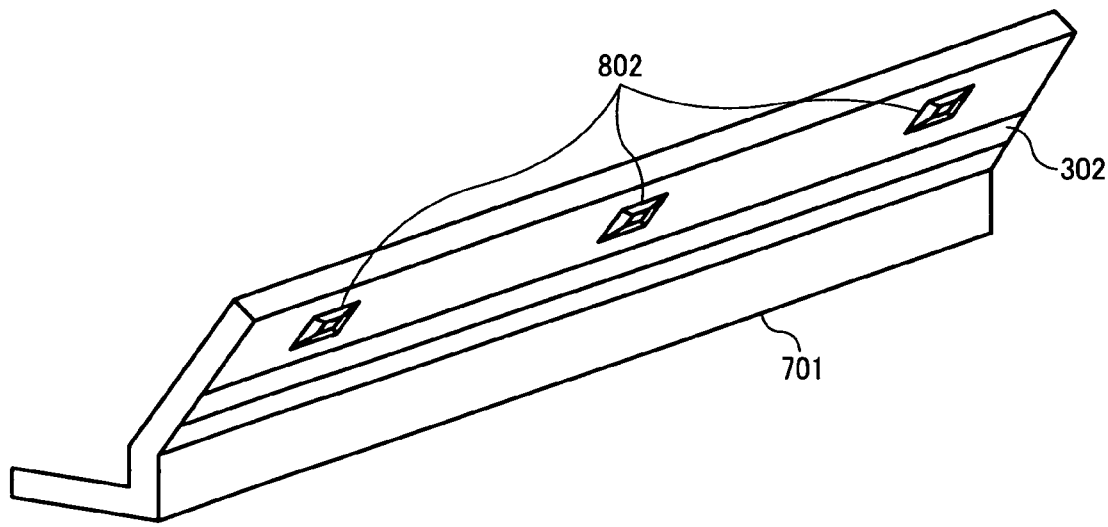
FIG. 7 is a perspective schematic view of a cover of the light projecting device of FIG. 6.
Figure 8:
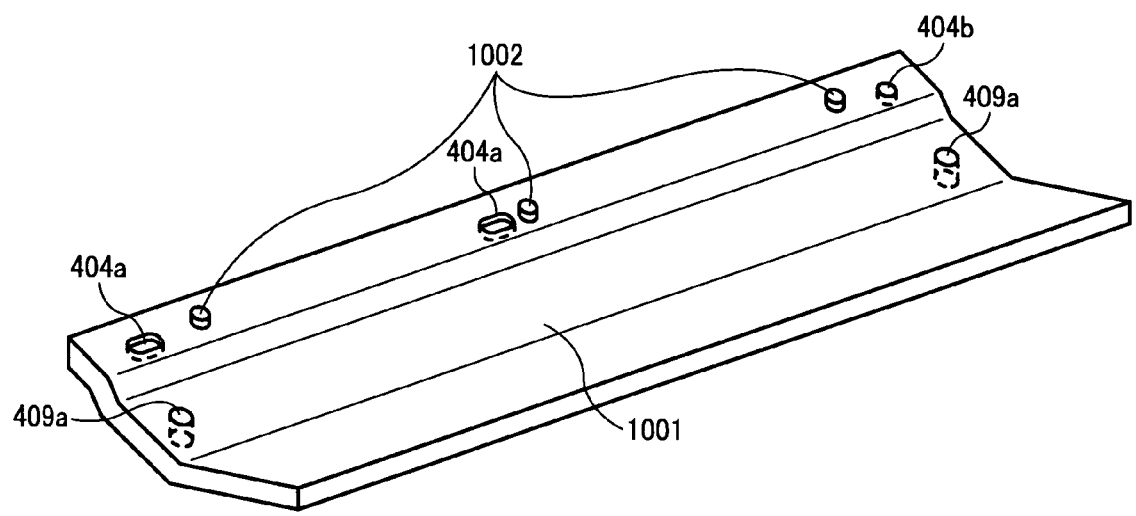
FIG. 8 is a perspective schematic view of a mounting table of the light projecting device of FIG. 6.
Figure 9:
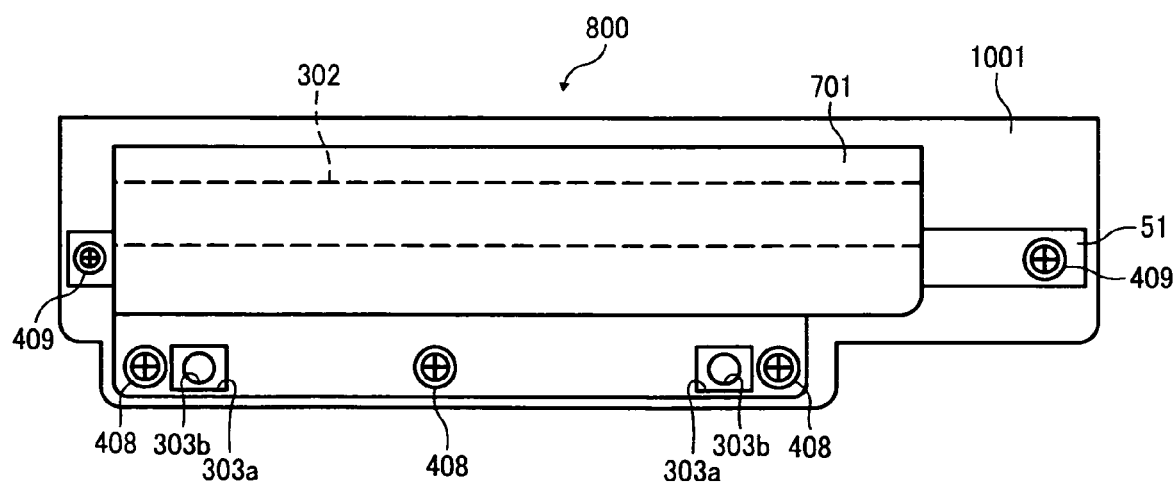
FIG. 9 is a plan schematic view of a light projecting unit according to the second embodiment of the present invention.
Figure 10:
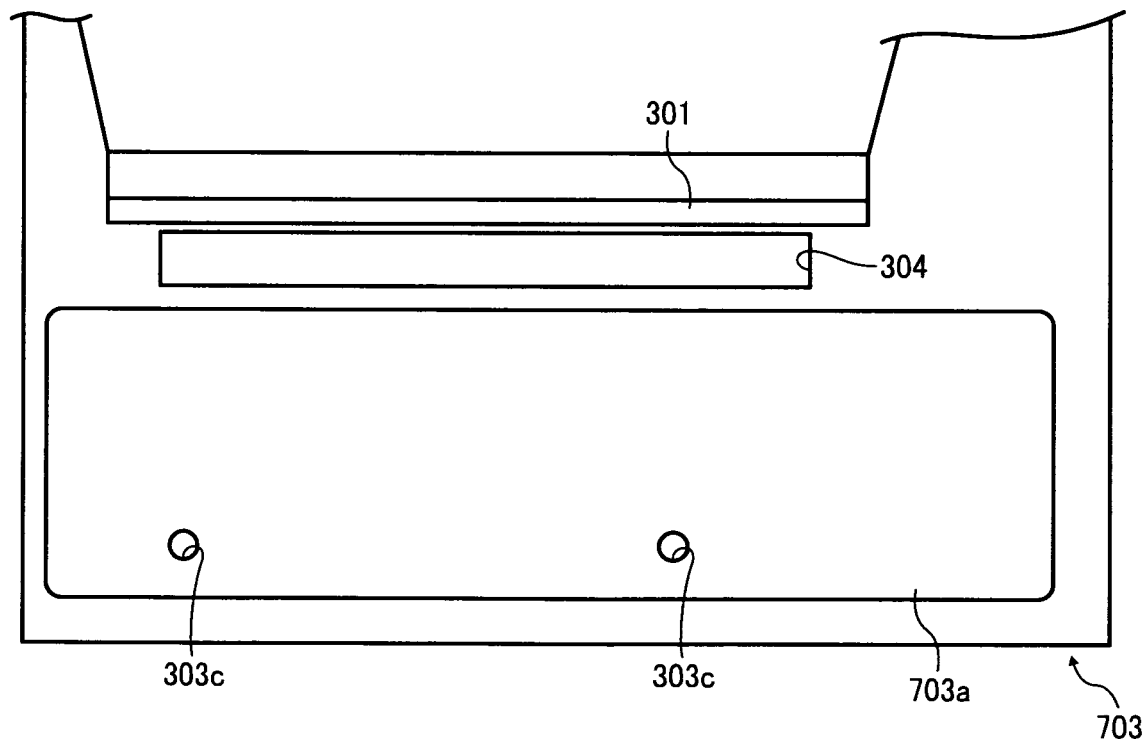
FIG. 10 is a plan schematic view of a chassis of the light projecting device according to the second embodiment of the present invention.

With reference to FIGS. 6 to 10, a description is provided of the first carriage according to a second embodiment. FIG. 6 is a front schematic view of the light projecting device according to the second embodiment. FIG. 7 is a perspective schematic view of a cover 701 (that corresponds to the cover 406 in FIG. 4). FIG. 8 is a perspective schematic view of a mounting table 1001 (that corresponds to the mounting table 405 in FIG. 4). FIG. 9 is a plan schematic view of a light projecting unit 800 including the cover 701, the light guiding plate 403, the LED board 51, and the mounting table 1001. FIG. 10 is a plan schematic view of the chassis of the light projecting device.

According to the present illustrative embodiment, the cover 701, the light guiding plate 403, the LED board 51, and the mounting table 1001 constitute the light projecting unit 800. Furthermore, the cover 701 includes projections 802, and the mounting table 1001 includes projections 1002. The light guiding plate 403 is sandwiched by the projections 802 and the projections 1002.

It is to be noted that the same reference numerals are given to constituent elements corresponding to the constituent elements of the first embodiment, and redundant descriptions thereof will be omitted unless otherwise stated. The strengthening ribs 601 are omitted herein.

As illustrated in FIG. 6, the projections 802 are integrally formed with the bottom surface of the cover 701 made of resin. The projections 802 are formed at the center of the cover 701 and both ends of the cover 701 in the longitudinal or the main scan direction. Three projections 802 are provided substantially at the radiation surface 403b side from the center of the light guiding plate 403 in the sub-scan direction and contact the top surface of the light guiding plate 403.

As illustrated in FIG. 7, the shape of the end plane (contact surface) of the projections 802 is substantially square. However, the shape is not limited to a square. Any other suitable shapes can be employed.

The projections 1002 are formed on the top surface of the mounting table 1001 formed of metal such as sheet metal using half-blanking process, for example. The projections 1002 are provided at the center and both ends of the mounting table 1001 in the longitudinal direction (the main scan direction). Three projections 1002 are provided substantially at the radiation surface 403b side from the center of the light guiding plate 403 in the sub-scan direction and contact the bottom surface of the light guiding plate 403.

The thickness of the projections 1002, that is, the height of the projections 1002 in vertical directions, is configured such that the bottom surface of the light guiding plate 403 and the top surface of the LED board 51 are substantially on the same plane.

As illustrated in FIG. 8, in the vicinity of the three projections 1002, two pin holes 404a and one pin hole 404b are provided.

The pin hole 404b at one end of the mounting table 1001 is a circular hole. Other pin holes, that is, the pin holes 404a are elongate holes.

When the light guiding plate 403 is mounted, the positioning pin 404 at one end of the light guiding plate 403 is inserted into the pin hole 404b and then other positioning pins 404 are inserted into the pin holes 404a. Screw holes 409a are formed at both sides of the mounting table 1001 to fix the LED board 51 by the screws 409.

According to the present illustrative embodiment, the light guiding plate 403 is sandwiched by the projections 802 of the cover 701 and the projections 1002 of the mounting table 1001. Although not illustrated, the cover 701 and the mounting table 1001 are fixed by screws at the same position on a chassis 703. Therefore, the pressing force of sandwiching the light guiding plate 403 depends upon a first angle between the chassis 703 and a slant surface of the mounting table 1001, and a second angle between the chassis 703 and a slant surface 701s of the cover 701 that coincides with the angle θ in FIG. 4. Flatness of the chassis 703 does not change the relation of the first and the second angles. Thus, variation in parts has less effect on the pressing force, thereby stabilizing the pressing force.

Except for the top and the bottom surfaces of the light guiding plate 403 that contact three projections 802 and three projections 1002, and the portion of the light guiding plate 403 that overlaps with a portion of the LED board 51, the light guiding plate 403 does not contact any other components. With this configuration, the light projected from the LEDs 43 is projected toward the contact glass 15 while being reflected in the light guiding plate 403 without being absorbed by other components.

A reflector 302 is provided on the bottom surface of the cover 701 along the main scan direction facing the LEDs 43 and the light guiding plate 403. When the light projected from the LEDs 43 is reflected by the incident surface 403a of the light guiding plate 403, the reflector 302 enables the light to enter the light guiding plate 403.

The cover 701 is detachably mounted to the mounting table 1001 by the screws 408. The mounting table 1001 is detachably mounted to the chassis 703 by screws, not illustrated. The mounting table 1001, the LED board 51, the light guiding plate 403, and the cover 701 constitute a single unit (hereinafter referred to as a light projecting unit 800).

As can be seen in FIG. 9, the light projecting unit 800 is movable while the cover 701 is attached to the mounting table 1001. With this configuration, the light projecting unit 800 can be attached to or detached from the first carriage 35 without adversely affecting the positional relation of the LED board 51 and the light guiding plate 403, thereby facilitating replacement of the light projecting unit 800.

As illustrated in FIG. 9, the mounting table 1001 includes two screw holes 303b to fasten the mounting table 1001 on the chassis 703 by two screws. Similarly, the cover 701 includes two screw reliefs (square through holes) 303a that are aligned with the screw holes 303b.

As illustrated in FIG. 10, a recessed portion 703a of the chassis 703 includes two screw holes 303c to fasten the light projecting unit 800 by the screws. The light projection unit 800 is fastened to the chassis 703 by the screws inserted into the screw holes 303c via the screw reliefs 303a and the screw holes 303b. The screw reliefs 303a, and the screw holes 303b and 303c serve as a second attach-detach mechanism.

The opening 304 is configured to direct the reflected light from the document on the contact glass 15 to the first mirror 44a.

According to the present illustrative embodiment, the light projecting unit 800 is detachably mounted to the chassis 703 so that the light projecting unit 800 can be attached to and detached from the first carriage 35 while the positional relation of the LED array already adjusted and the light projecting plate 403 is maintained. As a result, the light projecting unit 800 as a whole can be easily replaced with an adjusted light projecting unit upon shipping and/or maintenance without deteriorating the quality of the light projecting unit.

According to the present illustrative embodiment, the light guiding plate 403 is sandwiched by the projections 1002 of the mounting table 1001 and the projections 802 of the cover 701, thereby preventing the light guiding plate 403 from contacting components other than the projections 1002 and 802. With this configuration, the substantially entire surfaces of the top and the bottom surfaces and the side surfaces of the light guiding plate 403 can be used as reflective surfaces.

The total reflection in the light guiding plate 403 occurs when there is airspace around the light guiding plate 403. In order to reduce loss of light subjected to the total reflection, it is preferable that the light guiding plate 403 do not contact other components as described above, or a surface roughening process be performed on the contact surface of the components that contact the light guiding plate 403.

In this case, the top and the bottom surfaces and the side surfaces of the light guiding plate 403 in the main scan direction can reflect (totally reflect) the incident light from the LEDs 43.

This total reflection efficiently directs the light projected from the LEDs 43 to the irradiation region E, thereby making it possible to read the document P well.

According to the present illustrative embodiment, the reflector 302 is disposed on the rear surface of the cover 701 so that the light projected from the LEDs 43 at wide angle is reflected by the reflector 302 and incidents upon the top surface of the light guiding plate 403. Accordingly, it is possible to prevent the amount of light relative to the contact glass 15 and the reflector 301 from getting reduced.

It is to be noted that, according to the foregoing embodiment, the positional relation of three projections 802 of the cover 701, three positioning pins 404 of the light guiding plate 403, three projections 1002 of the mounting table 1001, and three screws 408 that fix the cover 701 to the mounting table 1001 is not limited. However, it is preferable to align those components on a straight line in the sub-scan direction. With this configuration, the light guiding plate 403 is sandwiched, and the pressing force can be concentrated on the pressure points at the center and at both sides.

For example, the projection 802 at the center of the bottom surface of the slant surface 701s of the cover 701, the positioning pin 404 at the center of the bottom surface of the light guiding plate 403, the projection 1002 at the center of the top surface of the mounting table 1001, the screw 408 that fixes the center of the attachment portion of the cover 701 constitute a first parts group. Similarly, the projection 802 at one end of the bottom surface of the slant surface 701s of the cover 701, the positioning pin 404 at one end of the bottom surface of the light guiding plate 403, the projection 1002 at one end of the top surface of the mounting table 1001, the screw 408 that fixes one end of the attachment portion of the cover 701 constitute a second parts group. Further, the projection 802 at the other end of the bottom surface of the slant surface 701s of the cover 701, the positioning pin 404 at the other end of the bottom surface of the light guiding plate 403, the projection 1002 at the other end of the top surface of the mounting table 1001, the screw 408 that fixes the other end of the attachment portion of the cover 701 constitute a third parts group.

In such a case, three parts of the first parts group, three parts of the second parts group, and three parts of the third parts group are arranged on three straight lines that are substantially parallel to each other in the sub-scan direction. In each group, it is preferable that the projection 802 face the projection 1002 (or the positioning pin 404).

Three projections 802 of the first through the third parts group press the center and both ends of the light guiding plate 403. Further, the incident surface side of the light guiding plate 403 presses the LED array side of the LED board 51 in the main scan direction, thereby preventing the light guiding plate 403 and the LED board 51 from undesirably rising from the mounting table 1001.

According to the present illustrative embodiment, the size of the cover 701 necessary for sandwiching the light guiding plate 403 depends only on the size of the projections 802. Thus, the molding process of the cover 701 can be easily performed.

Embodiment 3

Figure 11:
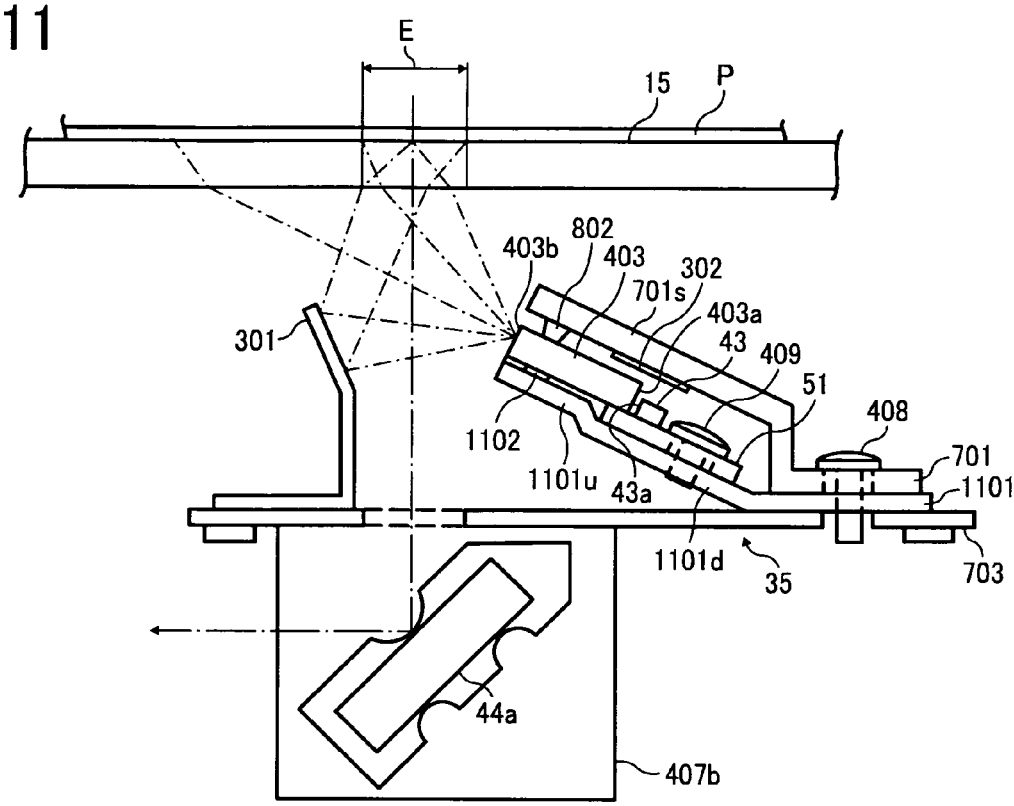
FIG. 11 is a front schematic view of a light projecting unit according to a third embodiment of the present invention.

Referring now to FIG. 11, there is provided a front schematic view of the first carriage according to a third embodiment of the present invention. According to the present illustrative embodiment, the cover 701 (equivalent of the cover 406 in FIG. 4), the light guiding plate 403, the LED board 51, and the mounting table 1101 (equivalent of the mounting table 405 in FIG. 4) constitute a single unit, the light projecting unit 800. Furthermore, the cover 701 includes projections 802, and the mounting table 1101 includes projections 1102. The light guiding plate 403 is sandwiched by the projections 802 and the projections 1102.

It is to be noted that the same reference numerals are given to constituent elements corresponding to the constituent elements of the first embodiment, and redundant descriptions thereof will be omitted unless otherwise stated. The strengthening ribs 601 are omitted herein.

As illustrated in FIG. 11, the projections 802 are integrally formed with the bottom surface of the slant surface 701s of the cover 701. The projections 802 are formed on the cover 701 at the center and both ends thereof in the longitudinal or the main scan direction. Three projections 802 are provided substantially at the radiation surface 403b side (the left end surface in FIG. 11) from the center of the light guiding plate 403 in the sub-scan direction and contact the top surface of the light guiding plate 403.

In order to prevent three projections 802 from absorbing the light incident upon the light guiding plate 403, three projections 802 are disposed between the LEDs 43 so as not to face the LEDs 43.

The projections 1102 are formed on the top surface of an upper step 1101u of the mounting table 1101 formed of metal such as sheet metal, using half-blanking process, for example.

The projections 1102 are provided at the center and both ends of the mounting table 1101 in the longitudinal direction (the main scan direction).

Three projections 1102 are provided facing the projections 802 of the cover 701 and contact the bottom surface of the light guiding plate 403. With this configuration, the light guiding plate 403 is sandwiched, and the pressing force is concentrated at three locations such as the center and both ends of the light guiding plate 403.

As described above, it is preferable that three projections 802 of the cover 701, three projections 1102 of the mounting table 1101, three screws 408 that fix the cover 701 to the mounting table 1101 are arranged on a straight line in the sub-scan direction.

In order to enable the projected light from the LEDs 43 to reliably incident upon the light guiding plate 403, it is preferable that three projections 1102 are provided substantially at the radiation surface 403b side (the left end surface in FIG. 11) from the center of the light guiding plate 403 in the sub-scan direction.

According to the present illustrative embodiment, the light guiding plate 403 is pressed at three locations, that is, at the center and both ends of the light, guiding plate 403 from the top and the bottom. With this configuration it is possible to prevent effectively the light guiding plate 403 and the LED board 51 from rising from the mounting table 1101 due to deformation of the LED board 51 and the light guiding plate 403.

As a result, the radiation surface 43a of the LEDs 43 is prevented from deviating from the incident surface 403a of the light guiding plate 403. Thus, the light projected from the LEDs 43 reliably incidents upon the light guiding plate 403.

The light guiding plate 403 is sandwiched by the projections 802 of the cover 701 and the projections 1102 of the upper step 1101u of the mounting table 1101. Except for the top surface of the light guiding plate 403 that contacts three projections 802, the bottom surface of the light guiding plate 403 that contacts three projections 1102, and the portion of the light guiding plate 403 that overlaps with the LED board 51, the light guiding plate 403 does not contact any other components. Therefore, the light projected from the LEDs 43 does not get absorbed by other components, and is directed to the contact glass 15 while the light is reflected (totally reflected) in the light guiding plate 403.

Furthermore, the reflector 302 is provided at the bottom surface of the cover 701 facing the LEDs 43 and the light guiding plate 403 over the main scan direction. The end surface of the reflector 302 extending in the main scan direction is in close contact with three projections 802.

According to the present illustrative embodiment, the mounting table 1101, the LED board 51, the light guiding plate 403, the cover 701 constitute the light projecting unit 800 as illustrated in FIG. 9. The light guiding unit 800 is movable while the cover 701 is mounted on the mounting table 1101 (1001 in FIG. 9).

According to the present illustrative embodiment, the cover 701 includes the projections 802 that contact the radiation surface side of the light guiding plate 403 (the left end surface in FIG. 11), thereby preventing the light guiding plate 403 from rising from the mounting table 1101. In particular, the center of the light guiding plate 403 in the main scan direction is prevented from rising. Accordingly, the positional relation of the LED array and the light guiding plate 403 can be stabilized, preventing irregularity in the amount of light in the main scan direction.

As described above, when the light guiding plate 403 is prevented from rising from the mounting table 1101, this means that the incident surface side of the light guiding plate 403 presses the LED board 51. In particular, the LED board 51 is prevented from rising from the mounting table 1101 at the center in the main scan direction. Hence, the heat generated by the LED board 51 is evenly transmitted to the mounting table 1101 and evenly dissipated in the main scan direction.

According to the present illustrative embodiment, the light guiding plate 403 is sandwiched by the projections 1102 of the mounting table 1101 and the projections 802 of the cover 701, and the light guiding plate 403 does not contact any other components except for the projections 1102 and 802, and the overlapping portion with the LED board 51. Therefore, the total reflection of both the top and the bottom surfaces and both side surfaces can be used.

It is to be noted that, in order to facilitate positioning and sandwiching the light guiding plate 403, the surface roughening process is performed on the surfaces of the projections 802 and 1102 that contact the light guiding plate 403. Accordingly, the contact surfaces of the projections 802 and 1102, and the light guiding plate 403 do not easily slip. The shape of the contact surfaces is not limited.

Embodiment 4

Referring now to FIG. 12, there is provided a front schematic view of the first carriage according to a fourth embodiment of the present illustrative embodiment. According to the present illustrative embodiment, a cover 1401 (equivalent of the cover 406 in FIG. 4), the light guiding plate 403, the LED board 51, and a mounting table 702 (equivalent of the mounting table 405 in FIG. 4) constitute a single unit. Furthermore, the cover 1401 includes projections 1402. The light guiding plate 403 is sandwiched by the projections 1402 and a portion of an upper step 702u of the mounting table 702.

It is to be noted that the same reference numerals are given to constituent elements corresponding to the constituent elements of the first embodiment, and redundant descriptions thereof will be omitted unless otherwise stated. The strengthening ribs 601 are omitted herein.

As illustrated in FIG. 12, the projections 1402 are integrally formed with the bottom surface of a slant surface 1401s of the cover 1401. The projections 1402 are formed at the center and both ends of the cover 1401 in the longitudinal or the main scan direction. Three projections 1402 are provided substantially at the incident surface 403a side (the right end surface in FIG. 12) from the center of the light guiding plate 403 in the sub-scan direction and contact the top surface of the light guiding plate 403.

In order to prevent three projections 1402 from absorbing the light incident upon the light guiding plate 403, three projections 1402 are disposed between the LEDs 43 so as not to face the LEDs 43.

It is to be noted that the shape of the contact surfaces the projections 1402 is not limited. Any shapes, for example, a rectangular shape or a circular shape that are easily molded, can be used.

In such a case, the light guiding plate 403 is sandwiched by the projections 1402 of the cover 1401 and an end portion of the upper step 702u of the mounting table 702 (at the right side in FIG. 12). Except for the top surface of the light guiding plate 403 that contacts three projections 1402, the bottom surface that contacts the portion of the upper step 702u of the mounting table 702, and the portion of the light guiding plate 403 that overlaps with the LED board 51, the light guiding plate 403 does not contact any other components. Therefore, the light projected from the LEDs 43 does not get absorbed by other components, and is directed to the contact glass 15 while the light is reflected (totally reflected) in the light guiding plate 403.

An angle θ' between the slant surface 1401s of the cover 1401 and the chassis 703 is smaller than the predetermined angle θ in FIG. 4. Therefore, the slant surface of the mounting table 702 and the slant surface 1401s of the cover 1401 are not parallel, that is, the space between the slant surface of the mounting table 702 and the slant surface 1401s of the cover 1401 is narrowed toward the light irradiation direction. Accordingly, the pressing force of the cover 1401 is concentrated on the projections 1402 projecting from the slant surface 1401s.

Furthermore, the reflector 302 is provided at the bottom surface of the cover 1401 facing the LEDs 43 and the light guiding plate 403 over the main scan direction. The end surface of the reflector 302 extending in the main scan direction is in close contact with three projections 1402.

According to the present illustrative embodiment, the mounting table 702, the LED board 51, the light guiding plate 403, the cover 1401 constitute the light projecting unit 800 as illustrated in FIG. 9. The light guiding unit 800 is movable while the cover 1401 is mounted on the mounting table 702.

According to the present illustrative embodiment, the cover 1401 includes the projections 1402 that contact the incident surface side (the LED array side) of the light guiding plate 403, thereby preventing the light guiding plate 403 from rising from the mounting table 702. In particular, the center of the light guiding plate 403 in the main scan direction is prevented from rising. Accordingly, the positional relation of the LED array and the light guiding plate 403 can be stabilized, preventing irregularity in the amount of light in the main scan direction.

As described above, when the light guiding plate 403 is prevented from rising from the mounting table 702, this means that the incident surface side of the light guiding plate 403 presses the LED board 51. In particular, the LED board 51 is prevented from rising from the mounting table 702 at the center in the main scan direction. Therefore, the heat generated by the LED board 51 is evenly transmitted to the mounting table 702 and evenly dissipated in the main scan direction.

By contrast, if the LED board 51 rises from the mounting table 702, the temperature of the LED board 51 varies in the main scan direction, causing irregularity in color and an amount of light.

According to the present illustrative embodiment, the light guiding plate 403 is sandwiched by the portion of the upper step 702u of the mounting table 702 and the projections 1402 of the cover 1401. The light guiding plate 403 does not contact any other components except for the projections 1102 and 802, and the overlapping portion with the LED board 51. Accordingly, the total reflection of both the top and the bottom surfaces and both side surfaces can be used.

According to the illustrative embodiments, since the light guiding efficiency is enhanced using the light guiding plate 403, the number of the LEDs 43 can be reduced while the quality of image reading is reliably maintained, reducing the cost of an image forming apparatus as a whole.

According to the illustrative embodiments, the present invention is employed in the image forming apparatus. The image forming apparatus includes, but is not limited to, an electrophotographic image forming apparatus, a copier, a printer, a facsimile machine, and a digital multi-functional system.

Furthermore, it is to be understood that elements and/or features of different illustrative embodiments may be combined with each other and/or substituted for each other within the scope of this disclosure and appended claims. In addition, the number of constituent elements, locations, shapes and so forth of the constituent elements are not limited to any of the structure for performing the methodology illustrated in the drawings.

Still further, any one of the above-described and other exemplary features of the present invention may be embodied in the form of an apparatus, method, or system.

For example, any of the aforementioned methods may be embodied in the form of a system or device, including, but not limited to, any of the structure for performing the methodology illustrated in the drawings.

Example embodiments being thus described, it will be obvious that the same may be varied in many ways. Such exemplary variations are not to be regarded as a departure from the scope of the present invention, and all such modifications as would be obvious to one skilled in the art are intended to be included within the scope of the following claims.

What is claimed is:

1. A light projecting device, comprising:
   a base board on which a plurality of light-emitting elements are arranged in a line along a main scan direction;
   a light guiding member facing a radiation surface of the light-emitting elements, to guide light projected from the light-emitting elements onto a target irradiation region of a target object;
   a holding member to hold the base board in place;
   a cover to cover the base board and the light guiding member;
   a positioning member to position the light guiding member on the holding member,
   wherein the light guiding member positioned on the holding member by the positioning member is positioned between the holding member and the cover, and
   wherein the cover includes a projection that contacts the light guiding member.

2. The light projecting device according to claim 1, wherein the projection is disposed substantially at a light-emitting element side from a center of the cover in a sub-scan direction orthogonal to the main scan direction.

3. The light projecting device according to claim 2, wherein the projection is disposed between adjacent light-emitting elements.

4. An image reading device to read an image on a document comprising the light projecting device of claim 1,
   wherein the light projecting device projects light onto an object and converts an amount of light reflected by the illuminated object into an image signal to read an image on the illuminated object.

5. An image forming apparatus, comprising:
   the image reading device of claim 4,
   wherein the illuminated object is a recording medium that bears the image read by the image reading device.

6. A light projecting device, comprising:
   a base board on which a plurality of light-emitting elements are arranged in a line in a main scan direction;
   a light guiding member facing a radiation surface of the light-emitting elements to guide light projected from the light-emitting elements onto a target irradiation region of a target object;
   a holding member to hold the base board in place;
   a cover to cover the base board and the light guiding member;
   a positioning member to position the light guiding member relative to the holding member; and
   a chassis on which the holding member is detachably mounted,
   wherein the holding member, the light guiding member positioned by the positioning member, the base board, and the cover constitute a single unit which is detachably mountable relative to the chassis, and
   wherein the cover includes a projection that contacts the light guiding member.

7. The light projecting device according to claim 6, wherein the projection is disposed substantially at a light-emitting element side from a center of the cover in a sub-scan direction orthogonal to the main scan direction.

8. The light projecting device according to claim 7, wherein the projection is disposed between adjacent light-emitting elements.

9. An image reading device to read an image on a document comprising the light projecting device of claim 6,
   wherein the light projecting device projects light onto an object and converts an amount of light reflected by the illuminated object into an image signal to read an image on the illuminated object.

10. An image forming apparatus comprising the image reading device of claim 9,
    wherein the illuminated object is a recording medium that bears the image read by the image reading device.

11. A light projecting device, comprising:
    a base board on which a plurality of light-emitting elements are arranged in a line in a main scan direction;
    light guiding means facing a radiation surface of the light-emitting elements, for guiding light projected from the light-emitting elements to a target irradiation region of a target illuminated object;
    holding means for holding the base board in place;
    a cover for covering the base board and the light guiding means; and
    positioning means for positioning the light guiding means relative to the holding means,
    wherein the light guiding means positioned on the holding means by the positioning means is positioned between the holding means and the cover, and
    wherein the cover includes a projection that contacts the light guiding means.

12. The light projecting device according to claim 11, wherein the projection is disposed substantially at a light-emitting element side from a center of the cover in a sub-scan direction orthogonal to the main scan direction.

13. The light projecting device according to claim 12, wherein the projection is disposed between adjacent light-emitting elements.

14. An image reading device to read an image on a document comprising the light projecting device of claim 11,
    wherein the light projecting device projects light onto an object and converts an amount of light reflected by the illuminated object into an image signal to read an image on the illuminated object.

15. An image forming apparatus, comprising:
    the image reading device of claim 14,
    wherein the illuminated object is a recording medium that bears the image read by the image reading device.

* * * * *